UNITED STATES PATENT OFFICE.

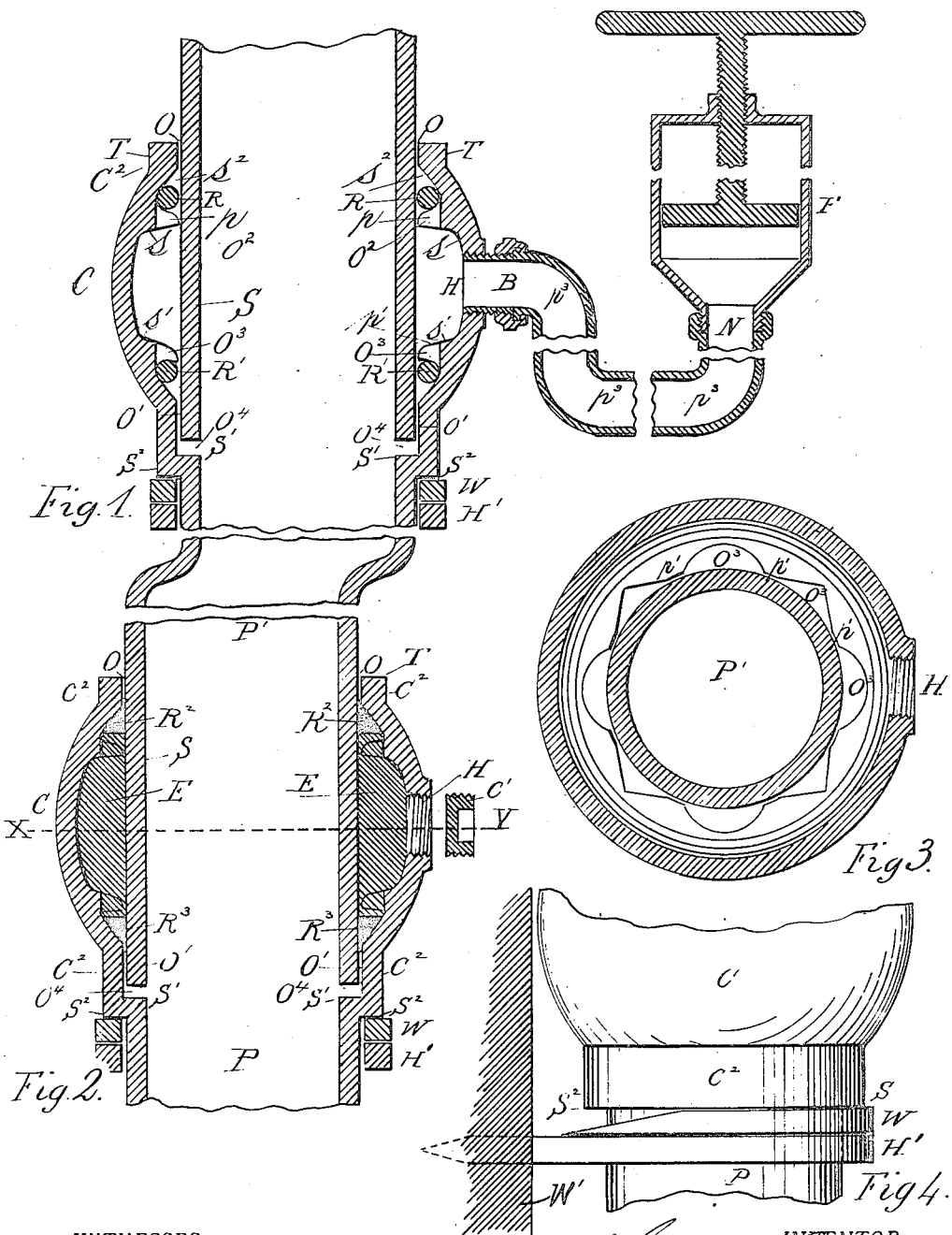

JOHN PICKERING PUTNAM, OF BOSTON, MASSACHUSETTS.

PIPE-JOINT.

1,151,614.  Specification of Letters Patent.  Patented Aug. 31, 1915.

Application filed May 19, 1905. Serial No. 261,260.

*To all whom it may concern:*

Be it known that I, JOHN PICKERING PUTNAM, of Boston, in the county of Suffolk and State of Massachusetts, have invented certain new and useful Improvements in Pipe-Joints, of which the following is a specification.

The object of my invention is to provide a flexible joint for gas, water, plumbing and other piping which shall be permanently tight under pressure and which shall enable lengths of piping to move or expand and contract longitudinally without affecting the tightness of the joint; which shall permit of the pipes being taken apart easily without injury to any part; and which requires neither fire nor heat on the premises where the joint is put together.

I attain these results by the mechanism illustrated in the accompanying drawings in which—

Figure 1 is a longitudinal section of the device showing the ends of three pipes connected by my joint, the middle pipe having an offset. Fig. 2 is a horizontal section of the same taken along X Y of Fig. 1, and Fig. 3 is a side view of the lower part of the joint.

Similar letters refer to similar parts throughout the several views.

C is the cup shaped end of one of the pipes P connected by my joint, and S is the plain or spigot end of another pipe P'. The cup is made just large enough at its outer end to receive the spigot without play room, but is gradually enlarged from this point until it reaches its maximum diameter a short distance below the outer end, when it again diminishes gradually to a size just large enough to receive the spigot. The gradual enlargement and diminution are so formed as to produce preferably a spherical shape. Beyond the spherical enlargement the cup has a cylindrical form for a short distance, the diameter of the cylinder being but just sufficient to receive freely the spigot without play-room. This cylindrical part has a length sufficient to permit of considerable longitudinal play within it of the end of the spigot when the pipes are subjected to varying degrees of temperature causing them to lengthen and shorten, without allowing the spigot end to withdraw from the cylinder. The sphere and cylinder together constitute the cup of the pipes and connect with it at the shoulder S'.

In the wall of the cup, at or near the center of its spherical enlargement is a threaded hole H through which a pliable, strongly adhesive cement packing, E, is forced cold into the space between the cup and the spigot by means of the force pump F.

In order to prevent the viscous semi fluid pliable packing from escaping under the heavy pressure exerted by the pump at the annular openings O and O' between the cup and spigot, soft packing rings, R, R', of jute, hemp or other suitable material sometimes designated "stuffing rings," are placed within the cup, one near the upper and one near the lower end of the spherical enlargement before the spigot S is inserted. These rings are held in place during the insertion of the spigot by the annular shoulders, S and S', and projections, $p$, $p$, $p'$, $p'$, cast upon them, the projections extending inward far enough to nearly touch the outer surface of the spigot. The upper surfaces of the projections are beveled so as to guide the spigot centrally when it is inserted into the cup.

The rings, R, R', are a little larger than the spigot so that the spigot will not rub against them on entering the cup and tend to force them down. When the rings, R, R', are in place and the spigot has been inserted, the pliable packing is forced through the hole H into the space between the cup and the spigot. The plastic packing passes through openings $O^3$ $O^3$, between the projections, $p$, $p'$, and presses against the rings R, and R', forcing them into the annular wedge shaped spaces, $s^2$, $s^3$, and compresses them into these spaces until they assume the forms shown at, $R^2$, $R^3$. They become proportionally dense and compact as the pressure exerted by the pump is increased. But the greater the pressure exerted and the more dense they become, the more powerfully they resist any tendency to crowd them out through the openings, O and O'. They thus present an absolute barrier to the escape of the pliable packing through these openings, O and O'.

When the pliable packing has been forced into every crevice between the cup and spigot, the pump F and its connecting piece, B, are removed and a cap C' is screwed into the hole H hard against the pliable packing and the joint is completed.

In order to provide for longitudinal expansion and contraction of the pipes due to changes of temperature, the spigot end of the pipe P' is first brought into close contact with the shoulder S' in the cup of the pipe P, and then before the packing is inserted lifted from the shoulder for a short distance corresponding with the amount of play room desired. This play room is provided also to give room for settlement or shrinkage of the walls of the building to which the pipes are attached. To enable this play room to be easily attained in setting the pipes, and to regulate its amount with exactitude, without relying upon any special skill on the part of the pipe setter, I make use of the following mechanism: The pipes are supported by hangers H' H' surrounding the pipes just below the external shoulder $S^2$ of the cylindrical part of the cupped enlargement, the hangers being secured firmly to the walls of the building, W'. The hangers are placed in contact with the shoulder $S^2$ when the spigot end of the pipe P' has been brought into contact with the shoulder S' in the cup of the pipe P. The pipe P' is then raised from the pipe P until the space $O^4$ between the spigot end of pipe P' and the shoulder S' of pipe P has been made as large as desired. The raising of the pipe P' by this exact amount is accomplished by driving a wedge W between the shoulder $S^2$ and the hanger H', the thickness of the wedge at its thickest part, being equal to the amount of the space $O^4$ desired. After the wedge has been driven home the pliable packing is forced in as already described. This wedge remains as a permanent part of the joint to sustain the pipe, the soft packing used being incapable of doing so. If at any time it becomes desirable to take down the pipes or any part of them, the work is accomplished by simply removing all the wedges of the joints to be disconnected, and the hangers, the elastic packing E then permitting the pipes to be easily separated without destroying either of them, the openings $O^4$ in the several pipes providing the necessary amount of leeway for their withdrawal one from the other.

In order to permit of my joint being made up easily in places ordinarily difficult of access, I use with it, between the hole H and the force pump F, a bent pipe $p^3$ $p^3$ $p^3$, of any suitable shape and material, whereby the pump may be operated at any convenient distance from the joint.

The nozzle N of the force pump is threaded to screw into the hole H which is threaded to correspond, and when the pipe, $p^3$ $p^3$ $p^3$, is used one of its ends is threaded into the hole H and the other end is provided with a thread like that of the hole H to receive the force pump nozzle. After the joint is made and filled with the pliable packing, the pipe $p^3$ $p^3$ $p^3$, if used, is left in place under certain conditions where the joint is exceedingly difficult of access. In this case the cap C' is screwed into the end of the pipe, $p^3$ $p^3$ $p^3$, instead of into the hole H.

The rings R, R', $R^2$ and $R^3$ are manufactured of any suitable compressible material. I prefer to give them a wedge shaped form in section as shown at $R^2$ and $R^3$ conforming to the shape of the space into which they are to be compressed, in order to secure the greatest tightness under the least amount of pressure applied by the force pump. But I do not wish to confine myself to this particular form of section, since a square section which may be stamped out by means of a die or a round section may be made to serve the same purpose of filling the required space under sufficient pressure of the force pump. The rings are protected by a coating which renders them proof against injury by the substances conveyed by the pipes in which they are used.

The cylindrical part, $C^2$, of the cupped end of the pipe, P, is made of such a length from the shoulder S' to the beginning of the spherical enlargement, that when the spigot end S of the pipe P' is raised to give the expansion space $O^4$, there shall still remain a sufficient length of cylinder to guide the spigot in the cupped enlargement and to prevent the escape of the packing ring, $R^3$, under the severest pressure. The upper part of the cupped enlargement, where it contracts to guide the spigot at O is so formed that the thickness of the cup at O shall extend along the spigot and form an annular ring sufficient in width to prevent the packing ring $R^2$ from escaping under heavy pressure. The cup is furthermore thickened at this end as shown at T for the double purpose of increasing the width of the annular space O and of strengthening the end of the pipe P for security against breakage in transportation.

I have designated my mechanism as a "pipe joint", but I do not wish to disclaim, because of the use of this term, the application of my device for coupling together any other two articles in which the use of this special mechanism or combination of parts may be convenient. For instance two pipes so jointed might have their free ends closed in such a way that one would constitute a jar or box, and the other its cover, and my invention would be as applicable to such a use as if the device were used on ordinary pipes alone. In such a case the mouth or neck of the box or bottle so connected with another vessel or its cover, becomes in effect, a short pipe, and this holds as well with reference to the cover as to the box itself, so that in my claims I use, for convenience, the term "pipes" to cover any vessels connected in the manner covered by my invention whether the free ends are open or closed.

What I claim as my invention and desire to secure by Letters Patent is—

1. In a pipe joint the combination of a plain end S of one pipe P'; a cylindrical enlargement $C^2$ on another pipe P of interior diameter just enough greater than that of the plain end to freely receive the latter without lateral play room, and of length sufficient to give a longitudinal play of the same equal to the maximum amount of longitudinal variation in the length of the pipe due to expansion and contraction and to the settlement and shrinkage of the building at the point of support of the pipe, a further enlargement C within the first gradually increasing in diameter over that of the cylindes so as to form annular wedge shaped spaces between the plain end of the pipe P' and the second enlargement of pipe P; compressible rings in each wedge shaped space; and adhesive plastice packing E between and in contact with the surfaces of both the greater enlargement and the plain end.

2. In a pipe joint the combination of the plain end of one pipe; an enlarged end of another pipe inclosing the same, the enlargement having an interior diameter just enough greater than the exterior diameter of the first pipe to receive the latter without lateral play room; a second enlargement beginning at a distance from the beginning of the first enlargement sufficient to allow for the maximum amount of play of the end of the inner pipe due to longitudinal changes of the entire length of said pipe between said end and the next adjoining joint, without said end escaping from the cylindrical enlargement; plastic packing between said inner pipe and said second enlargement, and a soft ring R' at the beginning of the second enlargement to retain the plastic packing.

3. In combination a pipe joint consisting of the plain ends of one pipe; an enlarged end of another pipe inclosing the plain end; a pliable packing between the two; a shoulder S' on the pipe P standing at some distance from said plain end S so as to provide a space $O^4$ between the two; a hanger supporting the enlarged end; and means for raising the enlarged end against the hanger used as a fulcrum and maintaining it in position so as to give expansion room between the plain end and the shoulder $S^2$ of the enlargement.

4. In combination a pipe joint consisting of a plain end of one pipe; an enlarged end of another pipe inclosing the plain end; a pliable packing between the two; a shoulder $S^2$ on the last mentioned pipe; a rigid support W' forming part of the building in which the joint is used; a hanger supporting the enlarged end upon said building support; and means for raising the enlarged end against the hanger used as a fulcrum and maintaining it in position.

5. In combination a pipe joint consisting of a plain end of one pipe; an enlarged end of another pipe inclosing the same and having a shoulder S' at the point of enlargement; packing between the two pipes; a hanger supporting the enlarged end; a shoulder $S^2$ on the last mentioned pipe P; and a wedge between the hanger and the shoulder to force up the pipe having the plain end and give expansion room between the plain end and the inner surface of the shoulder S' of the enlargement.

6. In combination a pipe joint consisting of a plain end of one pipe; an enlarged end of another pipe inclosing the same; packing between the two pipes; a shoulder on the enlargement of the last mentioned pipe; a rigid support under the shoulder; and a wedge between the rigid support and the shoulder for raising and maintaining in position the pipe having the shoulder so as to give expansion room between the end of the inner pipe and the enlarged end of the outer pipe.

7. In combination a pipe joint consisting of a plain end S of a pipe P'; an enlarged end $C^2$ of another pipe P inclosing the plain end; a support H' for the last mentioned pipe P; a wedge W between the support H' and the enlargement $C^2$; an inner shoulder S' on the enlargement, and a space $O^4$ between the plain end of the pipe P' and said inner shoulder.

8. In combination a pipe joint consisting of the plain end of one pipe; an enlarged end of another pipe of interior diameter just enough greater than the exterior diameter of the first mentioned pipe to receive the latter without lateral play room; a further enlargement within the first having an interior diameter greater than that of the first, and forming an annular packing chamber around the inner pipe, the increase in the diameter of the second enlargement being gradual and forming wedge shaped annular recesses at each end; and a wedge shaped compressible packing ring of section corresponding to the wedge shaped recess of the chamber.

9. In combination a pipe joint consisting of a plain end S of one pipe P'; an enlargement of cylindrical form $C^2$ of another pipe P just fitting over said plain end; a further enlargement beginning a short distance from the beginning of the first enlargement; a pliable tenacious packing between the two pipes; an inner shoulder and an outer shoulder on the last mentioned pipe P, standing at some distance from the plain end of the first mentioned pipe P'; and an externally supported hanger supporting the enlarged end, and means on the hanger for raising the pipe P at pleasure.

10. In a pipe joint the combination of the plain end S of one pipe P'; a cylindrical enlargement $C^2$ at the end of another pipe closely fitting over the plain end; a spherical enlargement C within the first enlargement, beginning at some distance from the beginning of the first enlargement; annular spaces of wedge shaped section formed at the junction of the sphere with the cylinder; packing rings in the annular spaces; packing E between the two pipes; and an opening in the spherical enlargement for the injection of the packing.

11. In a pipe joint the combination of a plain end S of one pipe P'; a cylindrical enlargement $C^2$ at the end of another pipe closely fitting over the plain end; a further enlargement within the first beginning at a distance from the beginning of the first enlargement sufficient to more than equal the maximum change of length due to physical changes affecting the first mentioned pipe P'; annular spaces of wedge shaped section at the junction of the second enlargement with the first enlargement; wedge shaped packing rings in the wedge shaped section; plastic packing E between the two pipes and means for forcing the packing into place.

12. In combination a pipe joint consisting of a plain end of one pipe and an enlarged end of another pipe inclosing the first; a hanger supporting the last mentioned pipe against a building; and a wedge between the hanger and the enlargement of the last mentioned pipe.

13. In combination a pipe joint consisting of a plain end of one pipe and an enlarged end of another pipe inclosing the first; a hanger supporting the enlarged end rigidly in place; and a wedge pointed staple for prying up the enlarged pipe end away from the hanger.

14. In combination a pipe joint consisting of a plain end of one pipe; an enlarged end of another pipe inclosing the plain end; packing between the two; a shoulder on the enlargement; an externally supported hanger supporting the enlarged end; and a wedge between the hanger and the shoulder of the enlargement, the wedge having a thickness at its thickest part equal to the greatest amount of play room desired between the plain end and the inner shoulder of the enlargement to completely accommodate the maximum longitudinal alteration possible of the pipe in use.

15. In a pipe joint the combination of a plain end of one pipe; an enlarged end of another pipe inclosing the same; a further enlargement of the last mentioned pipe; a packing E between the plain end and the further enlargement; a stuffing ring at one end of the enlargement, and means within the enlargement for holding the stuffing ring in place while the pipes are being coupled together.

16. In a pipe joint the combination of a plain end of one pipe; an enlarged end of another pipe inclosing the same; a further enlargement on the last mentioned pipe between the beginning and the end of the first enlargement; plastic packing E in the further enlargement; soft stuffing rings $R^2$ $R^3$ around the plain ended pipe at the junction of the first enlargement with the further enlargement; and means for introducing the packing E into the last mentioned enlargement and between the two stuffing rings $R^2$ $R^3$.

17. In a pipe joint the combination of a plain end of one pipe; an enlarged end of another pipe inclosing the plain end and closely fitting the same; a further enlargement within the first enlargement; projections around the inner pipe at the point of connection between the first mentioned and the second mentioned enlargements; compressible stuffing rings between said enlargements held in place by said projections; and plastic packing E in the further enlargement.

18. In a pipe joint the combination of a plain end of one pipe; an enlarged end of another pipe inclosing the same and closely fitting it; a further enlargement within the first having an interior diameter greater than that of the first, the increase in the diameter of the second enlargement over that of the first being gradual so as to form annular wedge shaped spaces at each of its ends; a compressible ring in each wedge shaped space; projections $p$ $p$ on the inner surface of the second enlargement and holding the rings in place when the pipes are coupled together, and plastic packing E between the plain pipe and the second enlargement of the outer pipe.

19. In a pipe joint the combination of a plain end of one pipe P'; an enlarged end of another pipe P inclosing the plain end, and closely fitting it; a further enlargement C within the first producing wedge shaped annular spaces at the junctions between the two enlargements and the inner pipe; wedge shaped soft rings in these annular spaces; projections $p$ $p$ surrounding the inner pipe at the junction of the two enlargements and holding the rings in place; plastic packing E between the inner pipe and the second enlargement; and openings $O^3$ between the projections; and means for forcing the packing E in place.

In testimony whereof I have affixed my signature, in presence of two witnesses.

JOHN PICKERING PUTNAM.

Witnesses:
  JOHN P. HAYDEN,
  THOMAS E. HINES.